United States Patent Office 3,827,947
Patented Aug. 6, 1974

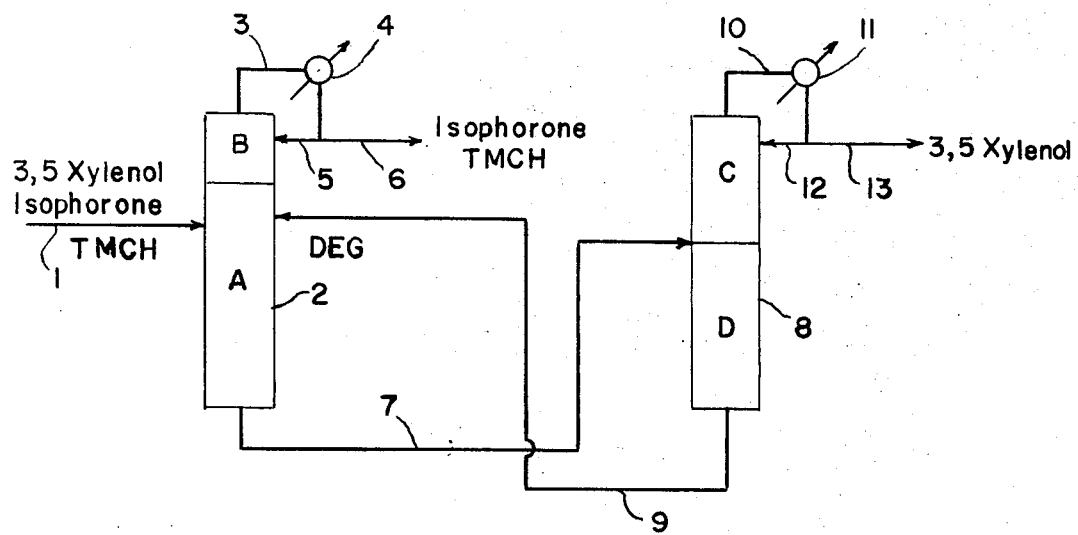

3,827,947
PURIFICATION OF 3,5-XYLENOL BY
EXTRACTIVE DISTILLATION
Frank W. Melpolder, Wallingford, Pa., Edward G. Guetens, Glendora, N.J., and Walter A. Mameniskis, Drexel Hill, Pa., assignors to Atlantic Richfield Company, Los Angeles, Calif.
Filed Feb. 28, 1973, Ser. No. 336,858
Int. Cl. B01d 3/40; C07c 37/38
U.S. Cl. 203—64                5 Claims

ABSTRACT OF THE DISCLOSURE

Method for the separation of isophorone and other impurities from 3,5-xylenol by extractive distillation with hydroxylated solvents, in particular diethylene glycol.

BACKGROUND OF THE INVENTION

This invention relates to a method for the purification of 3,5-xylenol synthesized either in a one or two step catalytic or thermal process wherein acetone is condensed to isophorone and the isophorone is converted to the 3,5-xylene. The isophorone separated from the 3,5-xylenol by the method of this invention can be recycled to the process for further conversion to the 3,5-xylenol.

The synthesis of 3,5-xylenol from acetone can be carried out either in a single stage or two stage process, either with or without the use of catalyst. In this process an intermediate product is isophorone which is converted to the 3,5-xylenol, but in general this conversion is incomplete so that there remains isophorone in the 3,5-xylenol as an impurity together with small amounts of other impurities, such as dihydroisophorone and the saturated homolog of isophorone, i.e., 3,3,5-trimethylcyclohexanone. Isophorone cannot be removed from the 3,5-xylenol by conventional fractional distillation because of the existence of a maximum boiling azeotrope containing about 35 percent isophorone and 65 percent 3,5-xylenol.

The present invention selectively increases the volatility of the isophorone relative to the 3,5-xylenol by the addition of a hydroxylated compound, such as diethylene glycol or other aliphatic glycols, glycol ethers or polyols, having boiling points substantially higher than the 3,5-xylenol such that isophorone can be removed in an extractive distillation process. Other impurities, such as the aforementioned dihydroisophorone and saturated homolog of isophorone, the 3,3,5-trimethylcyclohexanone, can also be removed easily by the method of this invention since its ultimate volatility is larger than that of isophorone.

PRIOR ART

It is known to purify an isomer of 3,5-xylenol, namely, 2,6-xylenol by crystallization from aqueous glycol as shown in U.S. Pat. 3,337,642 (1967) to Hoesff et al. It is also shown in U.S. Pat. 3,331,755 (1967) to Neuworth to employ extractive distillation to separate cresols from 2,6-xylenol using either diethylene glycol or triethylene glycol. This process however operates in a manner opposite to that of the instant invention since the 2,6-xylenol volatility is increased relative to the cresols, i.e., the cresols are more soluble in glycols than is the 2,6-xylenol. These disclosures, therefore, are not suggestive of the instant invention since neither the components nor the volatility behavior of the Neuworth invention is the same as in the instant invention.

SUMMARY OF THE INVENTION

In accordance with the instant invention isophorone and other impurities are separated from 3,5-xylenol which has been synthesized from acetone by extractive distillation with hydroxylated compounds preferably liquid at ambient temperatures, such as diethylene glycol or other aliphatic glycols, glycol ethers and polyols. The 3,5-xylenol product containing the impurities is introduced into a fractional distillation zone preferably of columnar design wherein it is distilled in the presence of the diethylene glycol or other hydroxylated compound. The isophorone and other impurities are removed overhead while the purified 3,5-xylenol is removed as a bottoms fraction together with the diethylene glycol. In a subsequent conventional fractional distillation zone the 3,5-xylenol is removed overhead and the diethylene glycol obtained as a bottoms fraction is recycled to the first fractional distillation zone for contact with fresh 3,5-xylenol-impurity containing solution.

It is an object of this invention therefore to provide a method for purifying 3,5-xylenol produced by the condensation of acetone.

It is another object of this invention to remove isophorone from 3,5-xylenol produced by the condensation of acetone employing extractive distillation with diethylene glycol.

It is another object of this invention to separate isophorone from 3,5-xylenol produced by the condensation of acetone by employing an extractive distillation process thereby obtaining a purified 3,5-xylenol product and isophorone for recycle to the conversion process to produce additional 3,5-xylenol.

Other objects of this invention will be apparent from the drawing, description of the invention and from the claims.

THE DRAWING

The drawing consists of a schematic flow diagram showing all of the principal process steps and the material flow therethrough. The drawing is further described in relation to the description of the invention which follows.

DESCRIPTION OF THE INVENTION

The 3,5-xylenol stream to be purified by the method of this invention is produced by the condensation of acetone, generally over suitable catalysts. In the two stage process the acetone is condensed to isophorone which in the second stage is converted to the 3,5-xylenol. A recently developed process employs a mixture of catalyst particles such that the condensation and conversion reactions occur in a single stage reactor.

In all such methods, including earlier prior art methods employing a thermal step for the conversion of isophorone to the 3,5-xylenol some isophorone together with other compounds, including these mentioned hereinbefore, contaminate the 3,5-xylenol product. The isophorone and the 3,5-xylenol form an azeotrope containing 35 weight percent isophorone and 65 weight percent 3,5-xylenol which is a maximum boiling azeotrope and therefore would be obtained as a bottoms fraction in a conventional fractional distillation. Thus in order to distill 3,5-xylenol overhead while retaining the isophorone in the bottoms azeotrope, the feed stream to the distillation column would have to be considerably higher in concentration of 3,5-xylenol than 65 percent. This however, would mean that as the process continued it would require a large portion of the product 3,5-xylenol to be recycled in order to convert the accompanying isophorone thus making the process entirely impractical.

It now has been found that if a compound such as diethylene glycol is added as in an extractive distillation process, the azeotrope no longer forms, and all the isophorone can be taken overhead from an extractive distillation column while the 3,5-xylenol is removed as a bottoms fraction with the glycol. A second conventional fractional distillation column is employed to distill the 3,5-xylenol overhead as product and return the diethylene glycol bottoms to the top feed part of the extractive distillation column as will be described in greater detail in the examples which follow and description of the drawing.

Example I

A number of distillation runs were carried out in an equilibrium vapor-liquid still at reduced pressure to determine the abnormalities of the isophorone-3,5-xylenol system. Sufficient data were obtained at different compositions to demonstrate the occurrence of the maximum boiling azeotrope. For example at about 250° F. and about 24 mm. Hg pressure the azeotrope comprised about 65 weight percent 3,5-xylenol.

At 250° F. the calculated terminal activity coefficients were 0.34 for 3,5-xylenol and 0.23 for isophorone, indicating negative type interactions between these components, i.e., the molecular association of isophorone and 3,5-xylenol is greater than the association between the same type of molecules by themselves, hence the formation of the maximum boiling azeotrope. This azeotrope was also found in a fractional distillation run.

Example II

It was found in additional runs that diethylene glycol in an amount above about 50 mole percent based on the moles of isophorone-3,5-xylenol mixture when added to such mixture caused a significant change in the volatilities of the impurities associated with the 3,5-xylenol, in particular, the isophorone.

The relative volatility of isophorone to 3,5-xylenol increased directly in proportion to the amount of diethylene glycol (hereinafter abbreviated to DEG and also in the drawing) present in the liquid phase. Thus at 50 mole percent DEG, the relative volatility of isophorone to 3,5-xylenol was 1.57, while at 82 mole percent DEG the relative volatility of isophorone to 3,5-xylenol increased to 5.65. These data demonstrate the suitability and advantage of DEG as a solvent in an extractive distillation process for the separation of isophorone from 3,5-xylenol.

Example III

Another undesirable impurity is found in the crude 3,5-xylenol stream from the synthesis reaction of the 3,5-xylenol from acetone. This impurity is the saturated homolog of isophorone, namely 3,3,5-trimethylcyclohexanone (hereinafter abbreviated to TMCH and also in the drawing). This compound also is easily separated by the method of this invention since its relative volatility increase is larger than that of isophorone.

Similarly dihydroisophorone and similar minor impurities can be removed by the method of this invention.

Example IV

Although diethylene glycol (DEG) is the preferred solvent, when other hydroxylated solvents preferably those which are liquids at ordinary ambient temperatures or slightly above, i.e., 30° C., are employed such as the aliphatic glycols, glycol ethers and polyols, also characterized by having boiling points above that of the 3,5-xylenol, equally effective separations are made in the extractive distillation process.

In order to demonstrate the invention more specifically and with additional clarity reference is made to the drawing.

The feed mixture comprised of the 3,5-xylenol, isophorone and 3,3,5-trimethylcyclohexane (TMCH) as a typical additional impurity is fed through line 1 into fractionating column 2 provided with conventional trays. The feed mixture is fed to the upper part of zone A of column 2 where an optimum concentration, preferably at least 50 mole percent, of DEG is maintained on the trays. Under these conditions both isophorone and the TMCH possess relative volatilities greater than the 3,5-xylenol such that conventional solvent fractionation or rectification takes place in zone A of the column and the isophorone and TMCH are taken overhead through line 3 as vapors and condensed in condenser 4 from which a liquid portion can be returned to rectifying section B of column 2 as reflux in accordance with conventional methods and the remainder of the isophorone and TMCH are recovered through line 6. If desired the isophorone can be recycled to the synthesis process for further conversion to 3,5-xylenol. The heat required for the distillation in column 2 can be supplied by a conventional reboiler system, not shown or by any convenient conventional means which will raise the temperature in the fractionation zone to above the boiling point of the mixture in the upper portion of the zone such that the isophorone and TMCH are vaporized and can be removed overhead as described.

The DEG solution containing the 3,5-xylenol which is free of isophorone and TMCH is removed from the bottom of column 2 through line 7 and introduced into the middle portion of fractionating column 8. The 3,5-xylenol has a relative volatility of 3 with respect to the DEG and therefore is readily separable and is taken overhead through zone C of column 8 by line 10 as a vapor and is condensed in condenser 11. One portion of the liquid can be returned through line 12 to the top of the column 8 to provide conventional reflux while the remaining pure product, 3,5-xylenol is removed through line 13. The DEG is withdrawn through fractionating zone D in column 8 as a liquid bottoms product through line 9 and returned to column 2 at a point above the feed introduction point but below the refluxing section B. Make-up DEG can be added at any point along this line if needed. As in the case of column 2, the heat for distillation in column 8 can be supplied by any conventional convenient means including a reboiler system, such heat being sufficient to raise the temperature of the mixture to a point where the 3,5-xylenol is vaporized overhead.

The use of DEG and related solvents as the extractive solvent in the method of this invention is advantageous in that such solvents, particularly DEG, markedly increases the volatility of isophorone and TMCH as well as similar impurities, but causes only a relatively small increase in the activity or volatility of the 3,5-xylenol. Accordingly, the isophorone and TMCH are easily distilled from the 3,5-xylenol when at least 50 mole percent DEG is present in the mixture and thereafter the 3,5-xylenol is easily distilled from the DEG. This provides an economical process for the purification of 3,5-xylenol.

We claim:

1. The method of separating impurities from 3,5-xylenol produced by the condensation of acetone which comprises subjecting the impure 3,5-xylenol mixture to extractive distillation by contacting said mixture in a first fractional distillation zone with a liquid hydroxylated solvent having a boiling point above the boiling point of the 3,5-xylenol in an amount of at least 50 mole percent based on moles of the feed, and selected from the group consisting of aliphatic glycols, glycol ethers and polyols removing the impurities as vapor from the top of the fractional distillation zone and said liquid hydroxylated solvent and 3,5-xylenol from the bottom of the fractional distillation zone.

2. The method according to Claim 1, wherein said hydroxylated solvent and 3,5-xylenol are introduced into a second fractional distillation zone wherein the temperature of said mixture is raised sufficiently to remove the 3,5-xylenol as a vapor overhead and the liquid hydroxylated solvent as a bottoms fraction.

3. The method according to Claim 2, wherein said hydroxylated solvent is returned to said first fractional distillation zone.

4. The method according to Claim 1, wherein said impure 3,5-xylenol mixture comprises predominantly 3,5-xylenol, isophorone and 3,3,5,-trimethylcyclohexanone.

5. The method according to Claim 1, wherein said hydroxylated solvent is diethylene glycol.

References Cited
UNITED STATES PATENTS

| | | | |
|---|---|---|---|
| 3,392,090 | 7/1968 | Parisse | 203—64 |
| 3,331,755 | 7/1967 | Neuworth | 203—64 |
| 3,337,642 | 8/1967 | Hoefs et al. | 260—621 A |

WILBUR L. BASCOMB, JR., Primary Examiner

U.S. Cl. X.R.

260—621 A